United States Patent
Ullman et al.

(10) Patent No.: US 7,259,748 B2
(45) Date of Patent: Aug. 21, 2007

(54) APPARATUS AND METHOD FOR CONTROLLING A CURSOR ON A VIEWING SCREEN

(75) Inventors: Eric Ullman, Fárö (SE); Tomas Brusell, Kongsberg (NO)

(73) Assignee: Ulf Parke, Stockholm (SE)

( * ) Notice: Subject to any disclaimer, the term of this patent is extended or adjusted under 35 U.S.C. 154(b) by 206 days.

(21) Appl. No.: 10/471,634

(22) PCT Filed: Mar. 12, 2002

(86) PCT No.: PCT/SE02/00449

§ 371 (c)(1),
(2), (4) Date: Mar. 26, 2004

(87) PCT Pub. No.: WO02/075515

PCT Pub. Date: Sep. 26, 2002

(65) Prior Publication Data

US 2004/0148174 A1   Jul. 29, 2004

(30) Foreign Application Priority Data

Mar. 15, 2001   (SE) .................................. 0100897

(51) Int. Cl.
*G09G 5/08* (2006.01)

(52) U.S. Cl. ...................... 345/157; 345/163; 345/167; 345/177

(58) Field of Classification Search ................ 345/157, 345/163, 167, 177
See application file for complete search history.

(56) References Cited

U.S. PATENT DOCUMENTS

| | | | | |
|---|---|---|---|---|
| 5,509,414 A | * | 4/1996 | Hok | ............................ 600/438 |
| 6,185,529 B1 | | 2/2001 | Chen et al. | |
| 6,503,197 B1 | * | 1/2003 | Nemirovski | ................ 600/300 |
| 6,535,116 B1 | * | 3/2003 | Zhou | ........................... 340/447 |

* cited by examiner

*Primary Examiner*—Richard Hjerpe
*Assistant Examiner*—Leonid Shapiro
(74) *Attorney, Agent, or Firm*—Potomac Patent Group PLLC

(57) ABSTRACT

An apparatus for controlling a cursor (10) on an electronic viewing screen (102) connected to a computer (104) without using hands. The apparatus comprises a detecting unit (108), intended to be carried by a user (106). The detecting unit (108) is provided with at least one ultrasonic device (110), which emits ultrasonic signals mainly in a direction towards the user's (106) mouth cavity and registers reflected ultrasonic signals. The apparatus further comprises a processing unit (116) for transforming the reflected ultrasonic signals into control signals intended to control the cursor (100). Thereby, the control signals create movement or activation of the cursor on the viewing screen such that different conditions in the mouth cavity are associated with specific cursor commands.

13 Claims, 3 Drawing Sheets

APPARATUS AND METHOD FOR CONTROLLING A CURSOR ON A VIEWING SCREEN

TECHNICAL FIELD

The present invention relates to an apparatus and method for controlling, without using hands, a cursor or so-called mouse pointer on an electronic viewing screen by a user by means of movements in the mouth cavity, in particular by the tongue.

BACKGROUND OF THE INVENTION AND PRIOR ART

In e.g. different kinds of personal computers, a so-called mouse is used to control a cursor on a viewing screen connected to the computer, by moving the mouse on a basis for displacing the cursor. The mouse is further typically provided with one or more clickable buttons for performing different operations in the computer, corresponding to the current position of the cursor on the screen. A number of known techniques exist within this field for providing the above-mentioned functions. For example, a freely rotating ball may be arranged at the bottom of the mouse, where the rotation of the ball during movement of the mouse over the basis is transformed into signals, which are transferred by means of a cable to the computer, where the signals are transformed into a corresponding command for producing movement of the cursor on the viewing screen. When clicking a mouse button, a command signal is transferred to the computer for executing a predetermined operation, depending on the position of the cursor, such as activating a program or an application. Known techniques also exist for wireless transmission of signals from the mouse to the computer, e.g. IR transmission or radio transmission, such as Bluetooth.

The mouse is typically operated by one of the user's hands, which is not possible or desirable in certain situations. Thus, there is a need for enabling cursor control without using any hand, e.g. for disabled persons, or when both hands, sometimes as well as feet, are occupied with other things, such as during car driving and when operating machines or instruments. Solutions have previously been proposed where the user can control the cursor by means of movements of the tongue and/or other parts of the mouth cavity or the face. The tongue is undeniably one part of the body, apart from the hands, which is the most easy to control for making a large number of different movements, without much effort and with great precision. The previously known solutions therefor typically involve some manipulating device corresponding to the mouse, which is placed inside the mouth cavity, such as a ball or the like being applied at a tooth row or in the palate, see for example DE 195 12 595 A1. However, it may be perceived by the user as troublesome to have a foreign object in the mouth, not least from a hygienic standpoint. Further, it may be percieved as uncomfortable to manipulate such an object by the tongue, since a certain muscular strength is typically required, which may result in tension pains or cramps. The manipulating device must also be applied correctly in the mouth cavity, and be cleaned and maintained, resulting in added efforts. Thus, there is a problem to use a manipulating device inside the mouth cavity for obtaining computer control without using hands.

SUMMARY OF THE INVENTION

It is an object of the present invention to obtain a sollution enabling control of a cursor or pointer on an electronic viewing screen by means of the tongue and/or other parts of the mouth cavity, without having to apply any manipulating object inside the mouth cavity.

This object and others are obtained by means of an apparatus comprising a detecting unit intended to be carried by a user. The detecting unit is provided with at least one ultrasonic device, which emits ultrasonic signals mainly in a direction towards the user's mouth cavity, and registers reflected ultrasonic signals. The apparatus further comprises a processing unit for transforming the reflected ultrasonic signals into control signals intended to control the cursor. Thereby, the control signals produce movement or other activation of the cursor on the viewing screen, such that each condition in the mouth cavity is associated with a specific cursor command.

BRIEF DESCRIPTION OF THE DRAWINGS

The present invention is described in more detail below using a preferred exemplary embodiment, and with reference to the attached drawings.

DETAILED DESCRIPTION OF PREFERRED EMBODIMENTS

Figure 1:
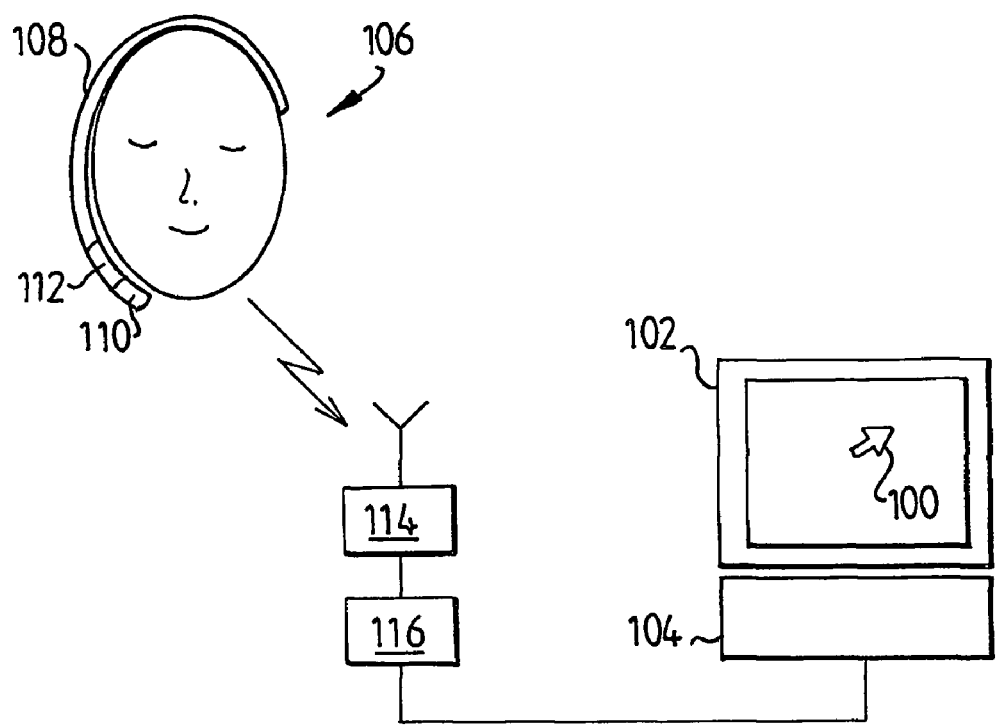
FIG. 1 is a schematic perspective view of an operating system for a viewing screen cursor.
Figure 2:
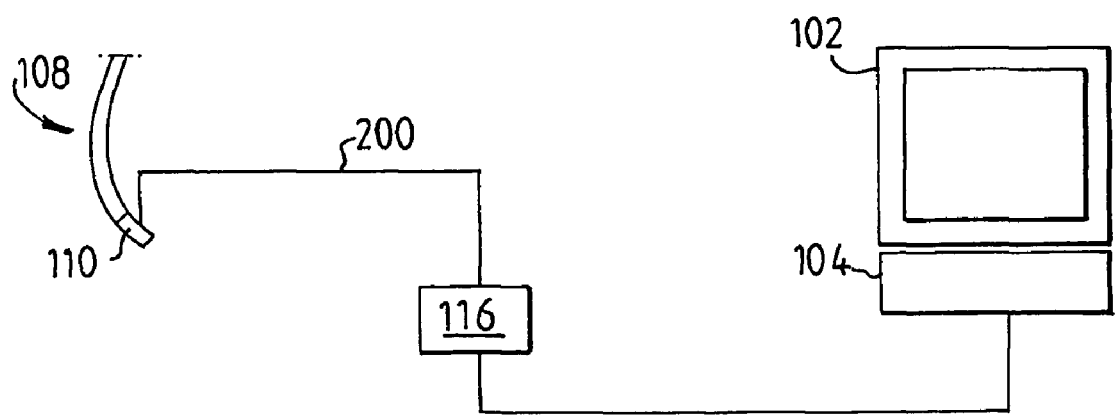
FIG. 2 is a schematic perspective view of an alternative embodiment of an operating system.

In FIG. 1, an operating system is shown for controlling a cursor 100 on an electronic viewing screen 102 connected to a computer 104. The computer 104 may be a PC or other unit with one or more processors. A user 106, which will control the cursor, carries a detecting unit 108 for detection of the user's movements inside the mouth cavity, in particular the tongue. The detecting unit 108 is provided with an ultrasonic unit 110 intended to emit ultrasonic signals mainly in a direction towards the user's mouth cavity, and to register signals being reflected against the tongue and/or other parts of the mouth cavity. The reflected signals being received in this way are thus related to the shape, position and/or movement of the tongue, as well as of other parts of the mouth cavity. In this embodiment, a transmitter at the detecting unit 108 is further arranged to transmit the reflection signals wirelessly to a receiver 114, which is connected to the computer 104 by way of a processing unit 116. The reflection signals coming in to the receiver 114, are forwarded to the processing unit 116 for treatment and analysis, and for transformation into control signals intended to control the cursor 100, which is described in more detail below. The transmission between the transmitter 112 and the receiver 114 can be obtained by means of any optional technique for wireless transmission, such as IR light or Bluetooth radio. It is also possible to use wired transmission, as schematically indicated in FIG. 2, where the reflection signals from the ultrasonic unit 110 are transferred through the cable 200 to the processing unit 116. However, the invention is not limited to any particular transmission technique.

Figure 3:
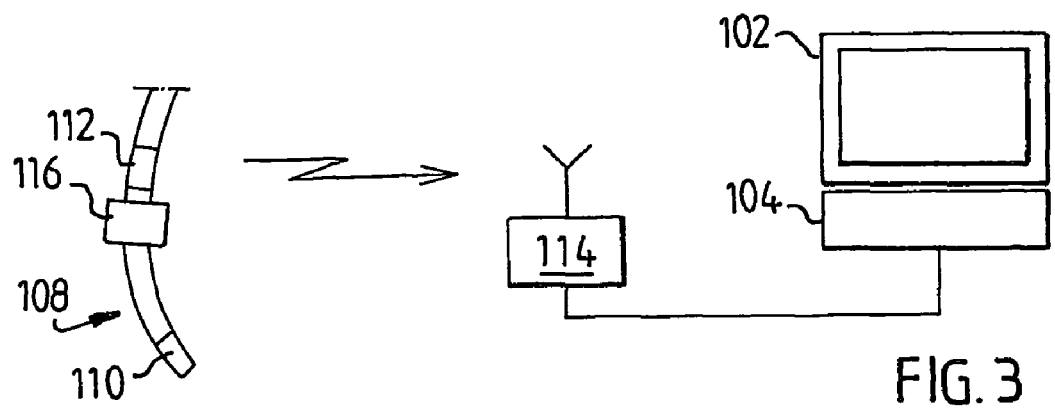
FIG. 3 is a schematic perspective view of a further alternative embodiment of an operating system.

In FIG. 3, a further alternative embodiment is shown, where the processing unit 116 is integrated together with the detecting unit 108. The reflection signals received at the ultrasonic unit 110 are treated and analysed, and are transformed into control signals by means of the processing unit 116 before being wirelessly transmitted from the transmitter 112 to the receiver 114.

According to one aspect of the invention, the detecting unit 108 is designed as a so-called headset, intended to be carried on the user's head, e.g., by being applied at an ear, or in an arch over the head. The invention is not limited to any particular design for carrying the detecting unit 108.

Figure 4:
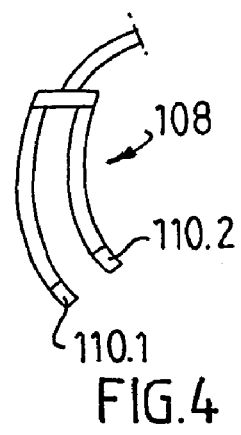
FIGS. 4-6 are schematic perspective views of some alternative detail embodiments.
Figure 5:
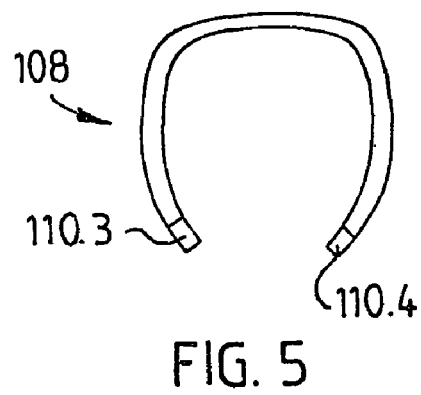
Figure 6:
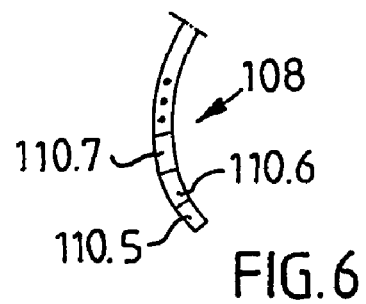

In FIGS. 1-3, the detecting unit 108 is designed as an arm positioned on one side of the user's face. FIGS. 4-6 illustrate some alternative embodiments of the detecting unit 108.

In FIG. 4, the detecting unit 108 comprises two arms positioned on one side of the user's face. Each arm is provided with an ultrasonic unit 110.1, 110.2.

FIG. 5 illustrates an embodiment with two arms positioned on either side of the user's face. Each arm is provided with an ultrasonic unit 110.3, 110.4.

FIG. 6 illustrates an embodiment with one arm provided with a plurality of ultrasonic units 110.5, 110.6, 110.7 . . . distributed along one side of the user's face.

In order to achieve efficient propagation of the ultrasonic signals in the mouth cavity, it is advantageous if the detecting unit 108 is designed such that the ultrasonic unit 110 lies close to the user's cheek or face.

Different combinations of the above-described embodiments are of course possible within the scope of the invention, which is not limited by the illustrated embodiments.

Figure 7:
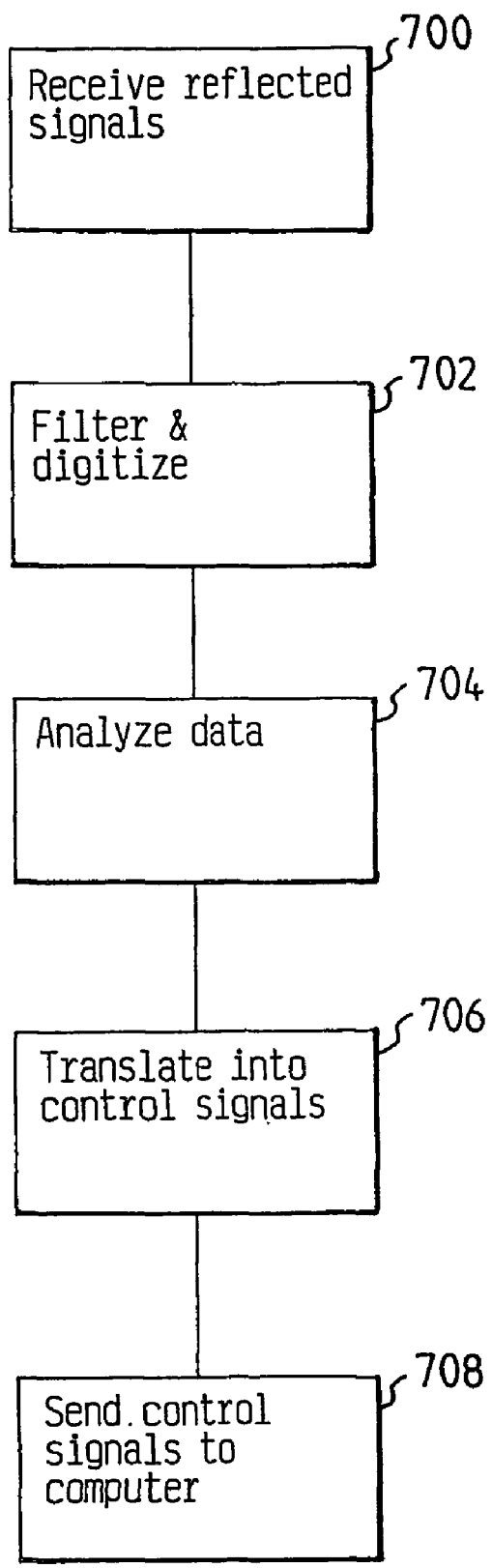
FIG. 7 is a flow chart of a working procedure of transforming reflected ultrasonic signals into control signals.

With reference to FIG. 7, the working procedure of the processing unit 116 will now be described more closely. The processing unit 116 has the task of transforming the reflection signals from the ultrasonic unit 110 into control signals, which are fed into the computer 104 for controlling the cursor 100. FIG. 7 illustrates a flow chart of an exemplary working procedure by the processing unit 116 to accomplish this transformation.

In step 700, reflection signals are received from the ultrasonic unit 110, which may comprise a predetermined sequence of a plurality of separate reflection registrations made during a certain period or continuously, at regular intervals by one or more ultrasonic units in a predetermined order. If reflections are registered in sequence by plural ultrasonic units distributed along an arm, such as illustrated for example in FIG. 6, scanning of the mouth cavity is accomplished.

In this example, the received reflection signals are analogue, and in step 702, the signals are filtered and digitized into a shape suitable for further treatment. The digital signals then constitute data as a number of samples or measured values, representing different conditions in the mouth cavity with respect to the shapes and relative positions of the tongue, cheeks and jaws. The tongue is used in particular to create such different conditions, since it is the part most easily manipulated with precision by the user.

In step 704, received data is analysed, e.g. by comparing with data stored in a table or database, to associate the measure values with specific conditions in the mouth cavity. In this way, an image or stereogram of the mouth cavity can be created.

Next in step 706, these conditions are translated into control signals, intended to be fed into the computer 104 for creating movement or activation of the cursor on the viewing screen. The translation into control signals can be made since different conditions in the mouth cavity are associated with specific cursor commands. These associations can be created in beforehand by means of a training process. Thus, the user can be trained to control the cursor by means of different tongue movements or other movements in the mouth cavity.

The extracted control signals are finally sent to the computer 104 in step 708, for controlling the cursor 100.

The invention claimed is:

1. An apparatus for controlling a cursor on an electronic viewing screen connected to a computer the apparatus comprising:
   a detecting unit carried by a user and having at least one ultrasonic device for emitting ultrasonic signals mainly in a direction towards a mouth cavity of said user and for registering reflected ultrasonic signals, and
   a processing unit for transforming the reflected ultrasonic signals into control signals for controlling the cursor.

2. An apparatus according to claim 1 wherein the detecting unit is adapted to be carried on a head of said user and comprises at least one arm to which the ultrasonic device is attached.

3. An apparatus according to claim 1 wherein the detecting unit comprises at least one arm arranged on either side of a face of said user and each arm is provided with at least one ultrasonic device.

4. An apparatus according to claim 2 wherein a plurality of ultrasonic devices are attached along the arm.

5. An apparatus according to claim 1 wherein the ultrasonic device is positioned proximal to a cheek of said user.

6. An apparatus according to claim 1 wherein the detecting unit is provided with a transmitter for wireless transmission of the reflected ultrasonic signals to the processing unit.

7. An apparatus according to claim 1 wherein the processing unit is integrated with the detecting unit.

8. An apparatus according to claim 7, wherein the detecting unit is provided with a transmitter for wireless transmission of the control signals to the computer.

9. A method of transforming reflected signals from an ultrasonic device into control signals for controlling a cursor on an electronic viewing screen connected to a computer said method comprising the steps of:
   receiving signals from the ultrasonic device reflected in a mouth cavity of a user,
   transforming the received signals into data representing different conditions in the mouth cavity, and
   analyzing and translating transformed data into control signals to create movement or activation of the cursor on the viewing screen wherein different conditions in the mouth cavity are associated with specific cursor commands.

10. A method according to claim 9 wherein associations between different conditions in the mouth and specific cursor commands are created by means of a training process.

11. The apparatus of claim 1, wherein the reflected signals correspond to conditions within the mouth cavity.

12. The apparatus of claim 11, wherein the reflected signals are related to a shape of the tongue.

13. The apparatus of claim 11, wherein the reflected signals are related to a position of the tongue.

* * * * *